March 11, 1930.  W. C. STATE  1,750,437
TIRE LINING MACHINE
Filed Sept. 9, 1926   3 Sheets-Sheet 2
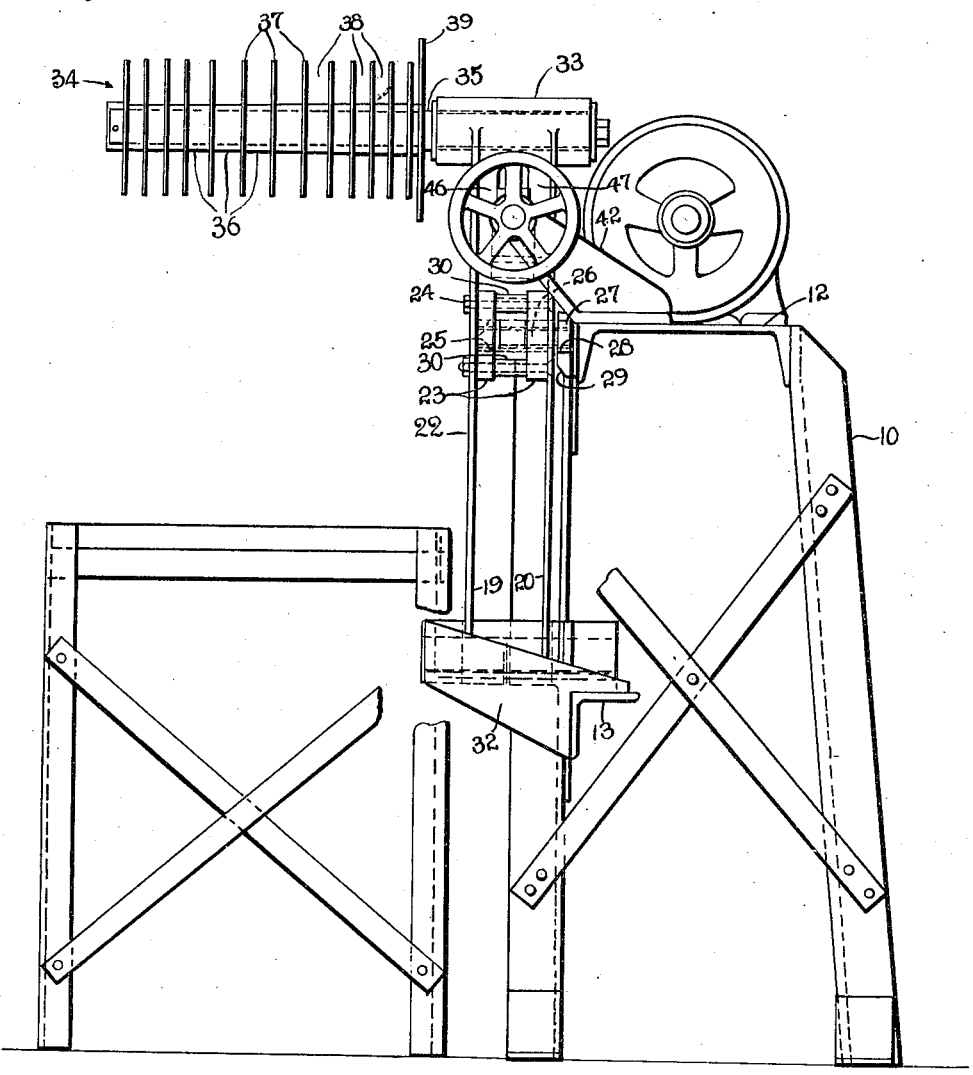
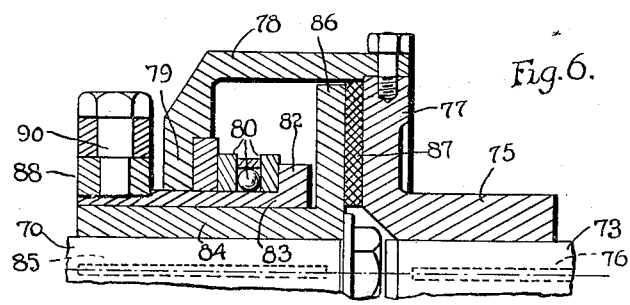
Inventor
Will C. State.
Attorney

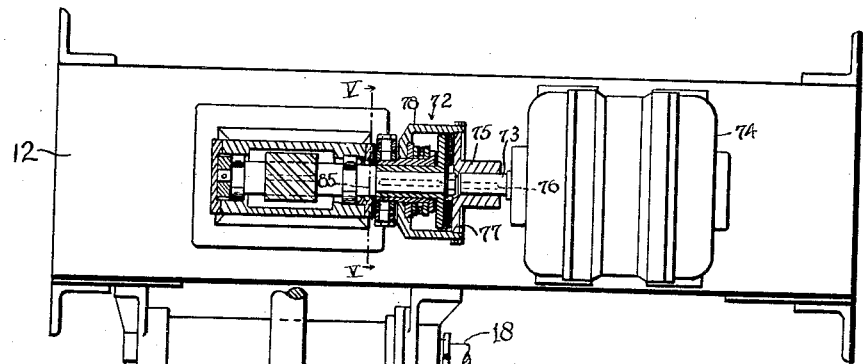
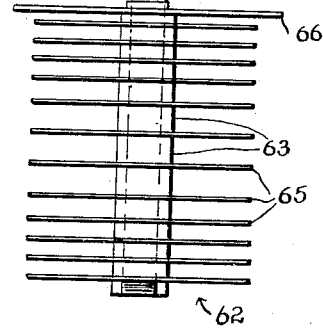
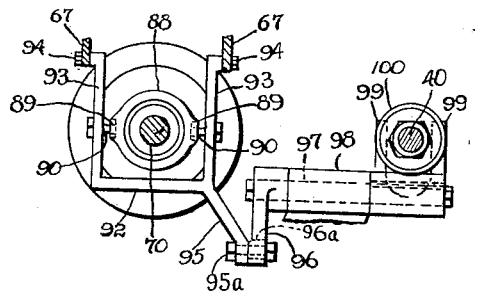
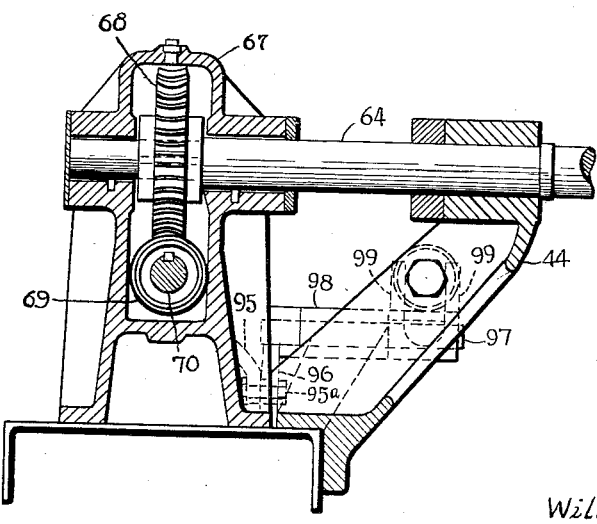

Patented Mar. 11, 1930

1,750,437

UNITED STATES PATENT OFFICE

WILL C. STATE, OF AKRON, OHIO, ASSIGNOR TO THE GOODYEAR TIRE & RUBBER COMPANY, OF AKRON, OHIO, A CORPORATION OF OHIO

TIRE-LINING MACHINE

Application filed September 9, 1926. Serial No. 134,508.

My invention relates to machines employed in manufacturing pneumatic tire casings and it has particular relation to a machine adapted to facilitate the application of non-adhesive material to the inner circumferential surface of pneumatic tire carcasses of the so-called flat-built type.

One object of my invention is to provide a machine so constructed that tire carcasses of substantially endless band configuration may be manipulated thereon so as to present their inner surfaces in such manner as to facilitate the uniform application of a coating of non-adhesive material over such surface.

Another object of my invention is to provide a machine adapted to support a tire carcass or band about a plurality of rotatable members under suitable tension and to provide novel mechanisms for controlling the operative movement of the rotatable members.

During the manufacture of pneumatic tire casings before they are vulcanized, it is customary to apply to the inner circumferential surface thereof a coating of non-adhesive material, such as soapstone, mica or potato flour, mixed with a suitable liquid. Such treatment renders the surface of the carcass non-adhesive, thereby preventing the carcass from adhering to the core upon which it is vulcanized or cured. This lining material is also useful for the reason that it prevents adhesion of the tire casing to the inner tube when the casing is in actual service.

Heretofore the chief difficulty in applying non-adhesive material to the tire carcass resided in the proper presentation of the inner surface of the carcass in order to rapidly and uniformly distribute the lining material thereover. My invention is directed to the problem of avoiding the inconvenience heretofore experienced, especially in lining tire casings of the so-called "flat-built" type.

A machine embodying my invention consists generally of a pair of rotatable roller members, one of which is adapted to be bodily moved toward and away from the other to exert a tension upon a tire band supported thereon, and mechanisms for driving and controlling the movement of the rollers. Each roller member is deeply grooved or includes in its structure a plurality of spaced disc-shape members. The tire carcass, in the form of an endless band, is disposed about the grooved rollers, one of the latter of which is bodily moved by means of a fluid operated mechanism to exert a tension upon the carcass. At the time one of the roller members is moved relative to the other, the fluid actuated mechanism functions to engage clutch members which are operatively connected to the other roller member to drive the latter. As the tire carcass or band travels upon the rolls, the workman applies non-adhesive material to the inner surface thereof with a brush or other suitable implement.

For a better understanding of my invention reference may now be had to the accompanying drawings forming a part of this specification of which—

Fig. 2 is an elevational view of the machine, the view being taken substantially at right angles to the view shown in Fig. 1;

Fig. 3 is a view partially in plan and partially in cross-section, illustrating the clutch mechanism employed in the machine embodying my invention;

Fig. 4 is a cross-sectional view illustrating in detail reduction gearing and clutch actuating elements of the machine;

Fig. 5 is a view, partially in elevation and partially in cross-section, illustrating mechanism for actuating a clutch embodied in my invention; and Fig. 6 is a fragmentary view, on a larger scale, illustrating in detail the construction of the clutch mechanism above referred to.

Figure 1:
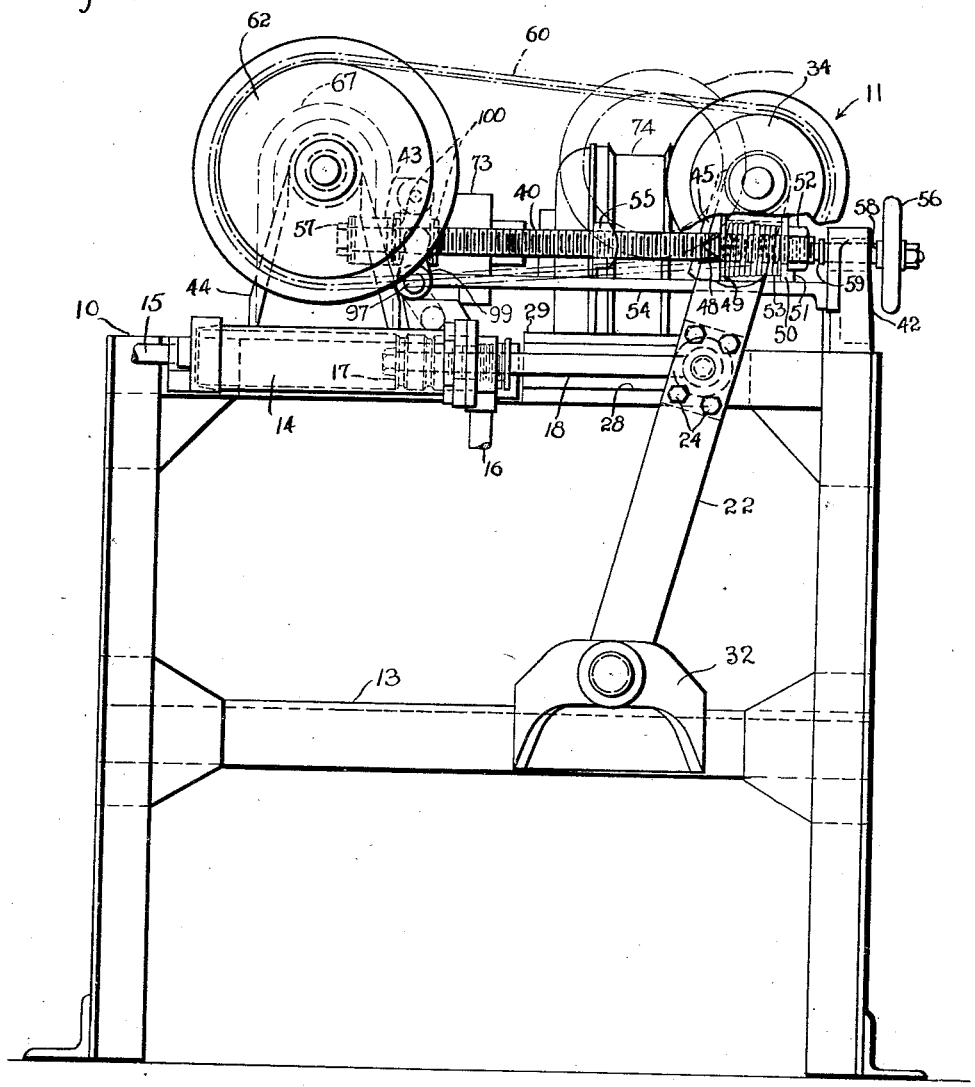
Fig. 1 is a side elevational view of a machine embodying my invention, parts thereof being broken away for the sake of clearness.

In practising my invention I provide a frame or table 10, which supports a tire carcass tensioning mechanism 11 secured upon a platform portion 12 of the frame and upon reinforcing cross members 13. The tensioning mechanism includes a cylinder 14 secured to the frame 10, the cylinder being provided with a pipe connection 15 adapted to convey fluid under pressure into one end of the cylinder. A second pipe connection 16 for conveying fluid under pressure is provided at the other end of the cylinder. These pipe connections admit air or other fluid into the cylinder to actuate a piston 17 from one end thereof to the other. A piston rod 18 extending through one end of the cylinder extends between two bars 19 and 20 (Fig. 2) of a lever member 22 and is secured therebetween by means of a pair of rigidly mounted blocks 23 and bolts 24 which pass therethrough. Each block 23 is provided with a slot 25, which receives a pin 26 vertically movable therein, the end of the piston rod 18 being directly pivotally connected to the pin 26. One end of the pin 26 extends laterally beyond the side bar 20 and is provided with a roller 27, which travels within a grooved guide 28 of a horizontally disposed track 29 rigidly secured to the frame 10. Suitable spacing sleeves 30 surround the bolts 24.

One end of the lever 22 is pivoted upon a bracket 32 secured to the frame member 13, while the other end thereof is provided with an elongate bearing bracket 33, which rotatably supports a roller member 34. As best shown in Fig. 2, the roller member 34 is composed of a shaft 35 provided with a plurality of spacing collars 36 secured thereto, the latter being adapted to firmly engage therebetween a plurality of disc-shape members 37. These members are spaced either uniformly or at irregular intervals, as may be desired. Preferably, they are spaced so as to provide a plurality of relatively deep annular grooves 38 therebetween. All of the disc-shape members 37 are of the same diameter and an additional outer disc member 39 of greater diameter is provided adjacent the bearing bracket 33 and serves as a guide flange.

The spaced lever members 19 and 20 straddle a threaded rod 40, which is journalled within a bracket 42 adjacent one end thereof, and adjacent its other end it is journalled within a bearing lug 43, integral with a bracket 44. The brackets 42 and 44 are rigidly secured to the frame 10. Adjacent the upper end of the lever 22, a forked plate member 45 is secured across the members 19 and 20, the forked portions 46 and 47 of the plate extending one on each side of the rod 40 and serving as abutments against which a relatively sharp edge 48 of a slidable abutment block member 49 rests. A second abutment 50, provided with an offset portion 51, is loosely mounted upon the rod 40 and is adjustable lengthwise thereof by means of a threaded nut 52. In order to cushion the force of the lever 22 as it swings toward the abutment block 50, a coil spring 53 is provided, which surrounds the rod 40 and abuts at its opposite ends against the respective blocks 49 and 50. The member 49 is loosely mounted upon the rod 40, and is slidable upon a horizontal guide 54 secured at each end to the frame 10.

An adjustable block 55 is also mounted in threaded engagement with the rod 40 and when adjusted, it slides upon the guide 54 which prevents it from turning with the rod. By turning a hand wheel 56, rigidly secured to the end of the rod 40, the position of the members 50 and 55 may be varied, thus varying the limits of swing of the lever 22 and roller member 34. In the event it is desirable to adjust the member 50 without changing the position of the block member 55, the member 50 is forced away from the nut 52 and the latter adjusted along the rod 40 by means of a wrench or other suitable implement. For purposes later to be described the rod 40 is permitted to move longitudinally within narrow limits defined by a nut 57 and by abutments 58 and 59.

Normally the roller member 34 assumes the position indicated in dot and dash lines of Fig. 1, at which position a tire carcass 60 in the form of an endless band is adapted to be disposed thereabout and also about a cooperating roller member 62 of the same type, although not necessarily of the same size. The roller member 62 includes a plurality of spacing collars 63, as best shown in Fig. 3, mounted upon a shaft 64, the spacing collars 63 firmly engaging therebetween a plurality of spaced disc-shape members 65 of equal diameter and a guide disc 66 of relatively greater diameter. The bearing bracket 44 secured to the frame 10 serves as a support for the shaft 64.

One end of the shaft 64 opposite the roller member 62 extends within a housing 67, as best illustrated in Fig. 4, which contains worm reduction gear mechanisms 68 and 69 of a well known type. The worm member 69 is secured to a shaft 70, which extends through the housing and is operatively connected by means of a clutch device 72, shown in Figs. 3 and 6, to an armature shaft 73 of a motor 74, the latter being adapted to drive the entire mechanism.

As best shown in Figs. 3 and 6, the clutch device 72 comprises a collar 75 slidably keyed, as indicated at 76, to the shaft 73, and is provided with a disc-shape flange 77. A cup-shape housing 78 rotatable with and rigidly secured to the collar 75 extends over the end of the shaft 70 and is relatively rotatable with respect thereto. One end 79 of the housing 78 constitutes an abutment for one side of a thrust bearing 80. The other side of the thrust bearing abuts against a flange 82 of a sleeve 83, which is slidable and rotatable upon a collar 84, the latter being rigidly secured upon the shaft 70, as indicated at 85. At the end of the collar 84, an integral flange 86 is formed, which cooperates with the flange 77, these flanges being provided with brake lining material 87 disposed therebetween and secured to either the one or the other thereof. By moving the flanges 77 and 86 toward each other against the brake lining 87, a positive drive is provided from the motor 74 to the gear reduction mechanisms 68 and 69 and thence to the roller member 62. The bearing 80 provides for relative rotative movement between the sleeve 83 and housing 78, and at the same time provides thrust means to facilitate the engagement of the clutch members 77, 86 and 87.

In order to actuate the clutch members, the sleeve 83 is provided with a ring 88 rigidly secured thereto and provided with openings 89 adapted to receive trunnions 90 of a yoke member 92.

As best shown in Fig. 5, the yoke 92 is provided with substantially vertically disposed arms 93 which straddle the ring 88 and are pivotally secured to the housing 67, as indicated at 94. An offset arm 95, preferably integral with the yoke 92, is pivoted by means of a pin 95ᵃ to a similar arm 96, the latter being provided with a slot 96ᵃ in which the pin 95ᵃ is loosely disposed. The arm 96 is keyed to one end of a shaft 97, which is journalled in a bearing bracket 98 supported upon the frame 10. The other end of the shaft 97 extends beyond the bracket 98 and rigidly supports a pair of fingers 99 extending on opposite sides of the rod 40 and also extending between two collar members 100 secured to the rod 40.

The operation of my machine is as follows. A flat-built tire carcass 60 is disposed over the roller members 62 and 34 when the latter is in the position indicated by dot-and-dash lines of Fig. 1. In this position of the elements of the machine, the motor 74 is running, but the friction elements of the clutch device 73 are not engaged to cause rotation of the rotatable member 62. After the tire carcass is positioned upon the rollers 62 and 34, the operator admits fluid under pressure through the fluid connection 15 into the cylinder 14, thereby operating the piston rod 18 to throw the lever 22 and the roller 34 to the position shown in full lines of Fig. 1. In this position of the machine the tire carcass 60 is tensioned as shown.

The spring 53 serves to cushion the lever as it is swung in a clockwise direction, as viewed in Fig. 1, but the force of the lever 22 against the block abutment 50 causes the rod 40 to be moved horizontally within the bearing brackets 42 and 43. By thus moving the rod the fingers 99 will be moved and the shaft 97 slightly rotated within the bearing 98 to cause the lower end of the yoke 92 to be swung about the pivot points 94. This movement engages the friction elements of the clutch 72 and consequently causes the roller member 62 to be rotatably driven by the motor 74. As the roller member 62 is rotated the tire carcass travels thereabout and about the cooperating roller member 34. While the tire carcass travels as described above, the operator applies thereto a coating of liquid lining material with a brush or mop by holding it against the inner surface of the carcass. The spaced discs 65 and 37 of the roller members prevent the lining material from collecting at localized points upon the inner surface of the carcass 60 and insures uniform distribution of the lining material thereover.

After the lining operation is completed, fluid is admitted into the supply pipe 16 to throw the lever 22 and roller member 34 back to normal position. As the lever swings in a counter-clockwise direction with respect to Fig. 1, it engages the member 55 and slides the rod 40 toward the left hand side of the frame 10. This movement of the rod actuates the yoke 92, consequently disengaging the clutch elements 86 and 87, thereby stopping rotation of the roller member 62. Then by removing the carcass from the roller member another may be placed in proper position for similar treatment.

From the foregoing description it will be apparent that the machine embodying my invention is of great economic value in speedily treating pneumatic tire carcasses preparatory to vulcanizing them and that the mechanical operation of the machine is of such simplicity that it functions efficiently under the care of an ordinary unskilled workman.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. An apparatus comprising a frame, relatively movable rotatable members for supporting an endless band, means for driving the rotatable members, a member pivoted to the frame and carrying one of the rotatable members, fluid operated means for moving the pivoted member and means controlled by the operation of the pivoted member for controlling the operation of the rotatable members.

2. An apparatus comprising a plurality of rotatable members each including a plurality of spaced substantially disc-shaped members defining a plurality of relatively deep grooves, means for tensioning an endless band upon the rotatable members including fluid operated means and means operatively associated with the fluid operated means for controlling operation of the rotatable members.

3. An apparatus comprising a frame, two grooved rollers mounted on the frame, a lever mechanism for moving one of the rollers toward and away from the other, means for rotatably driving one of the rollers and a clutch mechanism disposed between the means for driving the rotatable member and the lever mechanism, said clutch mechanism being automatically operated by the lever mechanism to control rotation of the rotatable means.

4. An apparatus comprising a frame, a lever pivoted to the frame, a roller rotatably mounted on one end of the lever, a second roller mounted on the frame, means for rotatably driving the second roller, means for swinging the end of the lever supporting the first roller toward and away from the second roller, and means for varying the extent of swinging movement of the first named roller toward and away from the second roller.

5. An apparatus comprising a frame, a roller rotatably mounted thereon, means for rotatably driving the roller, a member provided with a roller adapted to be moved toward and away from the first named roller, means for pivoting the member to the frame, a rod secured adjacent the rollers, adjustable means on the rod for resiliently limiting the degree of movement of the second roller away from the first, and means associated with the rod for automatically controlling the operation of the rollers.

6. A tire lining machine comprising a plurality of rotatable members each having a plurality of axially spaced bearing surfaces, means for tensioning a tire band on the rollers, and means for rotating the rollers.

In witness whereof, I have hereunto signed my name.

WILL C. STATE.